(12) United States Patent
Schulz et al.

(10) Patent No.: US 10,570,789 B2
(45) Date of Patent: Feb. 25, 2020

(54) ROTARY INTERNAL COMBUSTION ENGINE WITH SEAL LUBRICATION

(71) Applicant: Pratt & Whitney Canada Corp., Longueuil (CA)

(72) Inventors: Edwin Schulz, St-Bruno (CA); Etienne Plamondon, Candiac (CA); Jean Thomassin, Sainte-Julie (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 224 days.

(21) Appl. No.: 15/185,544

(22) Filed: Jun. 17, 2016

(65) Prior Publication Data

US 2017/0362974 A1   Dec. 21, 2017

(51) Int. Cl.
| | |
|---|---|
| *F01M 11/02* | (2006.01) |
| *F01C 21/04* | (2006.01) |
| *F01M 1/02* | (2006.01) |
| *F01M 5/00* | (2006.01) |
| *F02B 53/00* | (2006.01) |
| *F02B 55/02* | (2006.01) |
| *F02B 55/08* | (2006.01) |

(52) U.S. Cl.
CPC ............ *F01M 11/02* (2013.01); *F01C 21/04* (2013.01); *F01M 1/02* (2013.01); *F01M 5/002* (2013.01); *F02B 53/00* (2013.01); *F02B 55/02* (2013.01); *F02B 55/08* (2013.01); *F02B 2053/005* (2013.01)

(58) Field of Classification Search
CPC .......... F02B 55/08; F02B 53/00; F02B 55/02; F02B 2053/005; F01M 11/02; F01M 1/02; F01M 5/002; F01C 21/04

USPC ....... 418/85, 97–100; 123/18 A, 18 R, 43 A, 123/45 A, 200–249
See application file for complete search history.

(56) References Cited

U.S. PATENT DOCUMENTS

| | | | | |
|---|---|---|---|---|
| 2,778,539 A | * | 1/1957 | Bensinger ............... | F02M 69/12 222/250 |
| 3,098,605 A | * | 7/1963 | Bentele ................... | F02B 55/04 418/61.2 |
| 3,193,053 A | * | 7/1965 | Scherenberg ........... | F01C 21/04 123/196 R |
| 3,196,846 A | * | 7/1965 | Ohlendorf ............... | F02B 53/00 123/201 |
| 3,228,183 A | * | 1/1966 | Feller ..................... | F02B 53/00 123/205 |

(Continued)

FOREIGN PATENT DOCUMENTS

| | | |
|---|---|---|
| DE | 2502931 | 7/1975 |
| EP | 1141530 | 10/2001 |

*Primary Examiner* — J. Todd Newton
(74) *Attorney, Agent, or Firm* — Norton Rose Fulbright Canada L.L.P.

(57) ABSTRACT

A rotary internal combustion engine with a housing having a fluid passage defined therethrough opening into a portion of its inner surface engaging each peripheral or apex seal of the rotor. An injector has an inlet for fluid communication with a pressurized lubricant source and a selectively openable and closable outlet in fluid communication with the fluid passage for delivering the pressurized lubricant to each seal through the fluid passage. A housing for a Wankel engine and a method of lubricating peripheral seals of a rotor in an internal combustion engine are also discussed.

20 Claims, 9 Drawing Sheets

(56) References Cited

U.S. PATENT DOCUMENTS

| | | | | |
|---|---|---|---|---|
| 3,245,386 A * | 4/1966 | Bentele | ............... | F01C 19/04 418/123 |
| 3,280,812 A * | 10/1966 | Péras | ............... | F01M 11/02 123/196 R |
| 3,376,951 A | 4/1968 | Bosworth et al. | | |
| 3,387,595 A * | 6/1968 | Bentele | ............... | F02B 55/14 123/206 |
| 3,420,214 A * | 1/1969 | Bensinger | ............... | F02B 53/00 418/97 |
| 3,752,607 A * | 8/1973 | Bilobran | ............... | F01C 19/10 277/357 |
| 3,764,234 A * | 10/1973 | Morgan | ............... | F01C 21/045 123/73 V |
| 3,771,903 A * | 11/1973 | King | ............... | F01C 19/10 184/64 |
| 3,809,021 A * | 5/1974 | Lamm | ............... | F01M 9/00 123/208 |
| 3,811,806 A * | 5/1974 | King | ............... | F01C 21/04 184/64 |
| 3,814,555 A * | 6/1974 | Casey | ............... | F01C 21/04 418/142 |
| 3,844,691 A * | 10/1974 | Dobler | ............... | F01M 11/00 418/97 |
| 3,846,053 A * | 11/1974 | Roberts | ............... | F01C 19/02 123/26 |
| 3,868,929 A * | 3/1975 | Ishikawa | ............... | F01M 3/00 123/196 R |
| 3,884,601 A * | 5/1975 | Anthony | ............... | F01C 21/04 418/179 |
| 3,886,914 A | 6/1975 | Ahrns et al. | | |
| 3,888,606 A * | 6/1975 | Uy | ............... | F01C 1/22 418/178 |
| 3,913,706 A * | 10/1975 | Ernest | ............... | F01C 21/04 184/6.5 |
| 3,923,434 A * | 12/1975 | Walters | ............... | F01C 19/02 418/122 |
| 3,929,117 A * | 12/1975 | Green | ............... | F01M 1/10 123/196 R |
| 3,990,818 A * | 11/1976 | Loyd, Jr. | ............... | F01C 21/04 418/87 |
| 3,990,819 A * | 11/1976 | Ritchie | ............... | F01C 19/04 418/124 |
| 3,994,642 A * | 11/1976 | Johannes | ............... | F01C 21/18 418/99 |
| 4,011,032 A | 3/1977 | Steinwart et al. | | |
| 4,026,612 A * | 5/1977 | Goloff | ............... | F01C 21/04 384/416 |
| 4,072,449 A * | 2/1978 | Staebler | ............... | F01C 21/04 418/122 |
| 4,090,823 A * | 5/1978 | Ruf | ............... | F02B 55/04 418/94 |
| 4,106,169 A * | 8/1978 | Gibson | ............... | F01C 9/005 29/445 |
| 4,345,885 A * | 8/1982 | Turner | ............... | F01C 21/04 418/90 |
| 4,390,330 A * | 6/1983 | Kodama | ............... | F01C 21/04 184/6.26 |
| 4,463,718 A * | 8/1984 | Griffith | ............... | F01C 21/045 123/242 |
| 4,760,701 A * | 8/1988 | David | ............... | F01B 3/0079 123/228 |
| 4,765,291 A * | 8/1988 | Kurio | ............... | F01M 1/16 123/196 R |
| 4,774,918 A | 10/1988 | Noriyuki et al. | | |
| 4,969,429 A * | 11/1990 | Bartel | ............... | F01C 21/04 123/196 R |
| 5,203,307 A * | 4/1993 | Burtis | ............... | F01C 19/04 123/205 |
| 5,305,721 A * | 4/1994 | Burtis | ............... | F01C 19/04 123/205 |
| 6,325,603 B1 * | 12/2001 | Moller | ............... | F01C 1/22 418/86 |
| 8,671,907 B2 | 3/2014 | Mistry | | |
| 8,977,477 B2 | 3/2015 | Maki et al. | | |
| 8,985,085 B2 * | 3/2015 | Gekht | ............... | F01C 1/00 123/200 |
| 9,334,766 B2 | 5/2016 | Mordukhovich | | |
| 9,464,566 B2 * | 10/2016 | Ahdoot | ............... | F02B 53/02 |
| 9,523,310 B2 * | 12/2016 | Shkolnik | ............... | F01C 1/22 |
| 9,670,802 B2 | 6/2017 | Maki et al. | | |
| 9,885,274 B2 | 2/2018 | Sato | | |
| 2007/0084434 A1 * | 4/2007 | Leon | ............... | F01C 1/3566 123/241 |
| 2008/0190395 A1 * | 8/2008 | Rom | ............... | F01C 1/22 123/241 |
| 2014/0097044 A1 * | 4/2014 | Mullen | ............... | B64C 27/14 184/6.12 |
| 2014/0261291 A1 * | 9/2014 | Garside | ............... | F01C 1/22 123/200 |
| 2015/0167546 A1 | 6/2015 | Villeneuve et al. | | |
| 2017/0362974 A1 | 12/2017 | Schulz et al. | | |
| 2018/0057185 A1 * | 3/2018 | Cathcart | ............... | F02M 37/0088 |

* cited by examiner

ROTARY INTERNAL COMBUSTION ENGINE WITH SEAL LUBRICATION

TECHNICAL FIELD

The application relates generally to rotary internal combustion engines and, more particularly, to the lubrication of the seals in such engines.

BACKGROUND OF THE ART

Rotary internal combustion engines having peripheral seals, such as apex seals in Wankel engines, usually require oil injection to these seals to prevent excessive wear and loss of performance. Typically, such engines use a mechanical oil pump which driven by the rotatable shaft of the engine to deliver the oil to the seals through suitable fluid conduits communicating with the pump and with the environment of the seals; this pump is provided in addition to the main oil pump providing the oil circulation to other systems of the engine (e.g. bearing lubrication, rotor cooling). However, engine driven mechanical pumps have limited flexibility as to the frequency of injection, which is usually fixed for a given engine speed. Accordingly, the frequency of oil delivery to the seals may be difficult or impossible to adjust and tailor to specific operating conditions, particularly without a change in the quantity of oil being injected.

SUMMARY

In one aspect, there is provided an internal combustion engine comprising: a housing defining a rotor cavity; a rotor rotationally received within the rotor cavity to define a plurality of working chambers of variable volume around the rotor, the rotor having circumferentially spaced peripheral seals biased radially outwardly from the rotor and slidingly engaging a portion of an inner surface of the housing upon rotation of the rotor to separate the working chambers from one another, the housing having a fluid passage defined therethrough opening into the portion of the inner surface engaging each of the peripheral seals; and an injector having an inlet for fluid communication with a pressurized lubricant source and a selectively openable and closable outlet, the outlet being in fluid communication with the fluid passage for delivering the pressurized lubricant to the peripheral seals through the fluid passage.

In another aspect, there is provided a housing for a Wankel engine, comprising: a peripheral wall extending between two axially spaced apart end walls, the peripheral and end walls cooperating to enclose a rotor cavity configured for sealingly engaging a rotor rotatable therein, the housing having a fluid passage defined therethrough opening into an inner surface of the peripheral wall to communicate with the rotor cavity; and an injector having an inlet for fluid communication with a pressurized lubricant source and a selectively openable and closable outlet, the outlet being in fluid communication with the fluid passage for delivering the pressurized lubricant to the rotor cavity.

In a further aspect, there is provided a method of lubricating peripheral seals of a rotor in an internal combustion engine, the rotor rotatable inside a rotor cavity defined by a housing of the engine, the method comprising: circulating lubricant from a pressurized lubricant source to an injector; selectively opening an outlet of the injector; and when the outlet of the injector is open, delivering the pressurized lubricant through the housing and to an inner surface of the rotor cavity with the injector, the peripheral seals contacting the inner surface upon rotation of the rotor within the rotor cavity.

DESCRIPTION OF THE DRAWINGS

Reference is now made to the accompanying figures in which.

DETAILED DESCRIPTION

Figure 1:
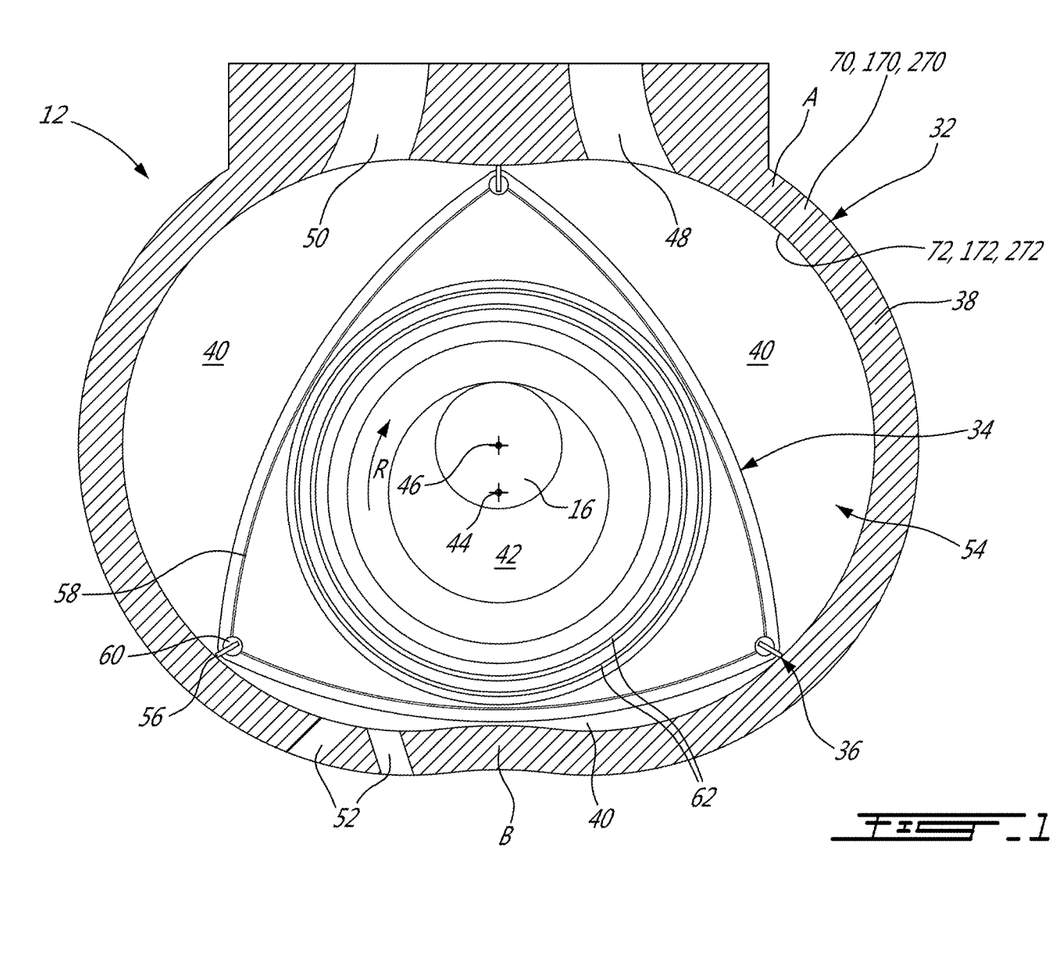
FIG. 1 is a schematic cross-sectional view of a rotary internal combustion engine in accordance with a particular embodiment, taken in a plane perpendicular to an axial direction of the engine.

FIG. 1 illustrates an example of a rotary intermittent internal combustion engine 12 of the type known as a Wankel engine. It is understood that the configuration of the engine 12, e.g. placement of ports, number and placement of seals, etc., may vary from that of the embodiment shown.

The engine 12 comprises a housing 32 defining a rotor cavity having a profile defining two lobes, which is preferably an epitrochoid. A rotor 34 is received within the rotor cavity. The rotor defines three circumferentially-spaced apex portions 36, and a generally triangular profile with outwardly arched sides. The apex portions 36 are in sealing engagement with the inner surface of a peripheral wall 38 of the housing 32 to form and separate three working chambers 40 of variable volume between the rotor 34 and the housing 32. The peripheral wall 38 extends between two axially spaced apart end walls 54 to enclose the rotor cavity.

The rotor 34 is engaged to an eccentric portion 42 of an output shaft 16 to perform orbital revolutions within the rotor cavity. The output shaft 16 performs three rotations for each orbital revolution of the rotor 34. The geometrical axis 44 of the rotor 34 is offset from and parallel to the axis 46 of the housing 32. During each orbital revolution, each chamber 40 varies in volume and moves around the rotor cavity to undergo the four phases of intake, compression, expansion and exhaust.

An intake port 48 is provided through the peripheral wall 38 for admitting compressed air into one of the working chambers 40. An exhaust port 50 is also provided through the peripheral wall 38 for discharge of the exhaust gases from the working chambers 40. Passages 52 for a spark plug or other ignition mechanism, as well as for one or more fuel injectors of a fuel injection system (not shown in FIG. 1) are also provided through the peripheral wall 38. Alternately, the intake port 48, the exhaust port 50 and/or the passages 52 may be provided through the end or side wall 54 of the housing. A subchamber (not shown) may be provided in communication with the chambers 40, for pilot or pre injection of fuel for combustion.

For efficient operation the working chambers 40 are sealed by spring-loaded peripheral or apex seals 56 extending from the rotor 34 to engage the inner surface of the peripheral wall 38, and spring-loaded face or gas seals 58 and end or corner seals 60 extending from the rotor 34 to engage the inner surface of the end walls 54. The rotor 34 also includes at least one spring-loaded oil seal ring 62 biased against the inner surface of the end wall 54 around the bearing for the rotor 34 on the shaft eccentric portion 42.

In a particular embodiment which may be particularly but not exclusively suitable for low altitude, the engine 12 has a volumetric compression ratio of from 6:1 to 8:1.

The fuel injector(s) of the engine 12, which in a particular embodiment are common rail fuel injectors, communicate with a source 30 (see FIG. 2) of Heavy fuel (e.g. diesel, kerosene (jet fuel), equivalent biofuel), and deliver the heavy fuel into the engine 12 such that the combustion chamber is stratified with a rich fuel-air mixture near the ignition source and a leaner mixture elsewhere.

Figure 2:
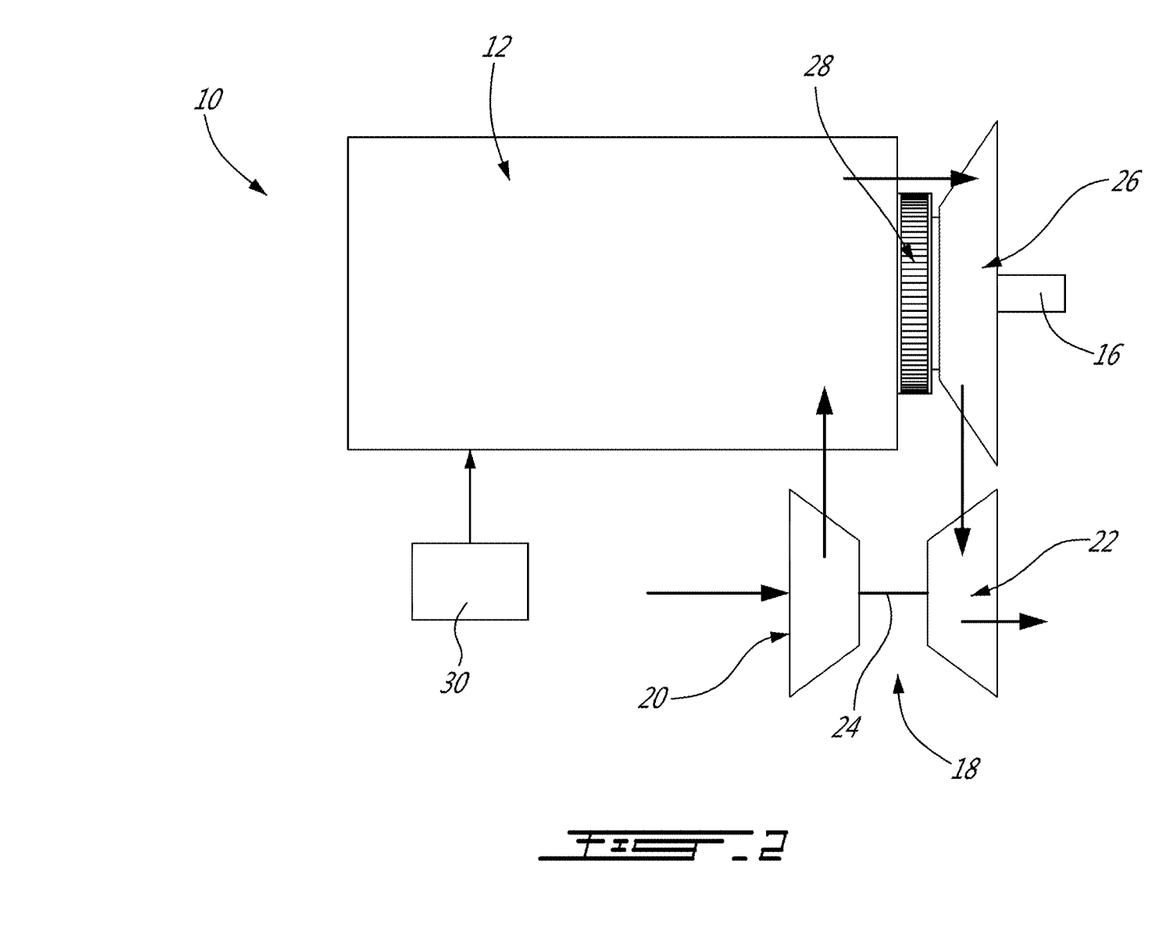
FIG. 2 is a schematic representation of a compound cycle engine in which the internal combustion engine of FIG. 1 may be used.

In a particular embodiment, the rotary engine 12 is used in a compound cycle engine 10 such as schematically shown in FIG. 2, where one or more rotary engines 12 drive a common load connected to the output shaft 16. The compound cycle engine 10 also includes a turbocharger 18, including a compressor 20 and a turbine 22 which are drivingly interconnected by a shaft 24, with the compressor 20 of the turbocharger 18 compressing the air before it enters the rotary engines(s) 12. The exhaust flow from the rotary engine(s) 12 is supplied to a compound turbine 26 in fluid communication therewith, also driving the common load, for example connected to the output shaft 16 through an appropriate type of transmission 28. The exhaust flow from the first stage turbine 26 is supplied to the second stage turbine 22 of the turbocharger 18.

Alternately, the rotary engine 12 may be used without the turbocharger 18 and/or without the compound turbine 26, and with or without one or more other rotary engine(s) 12 engaged to the same output shaft 16. In a particular embodiment, the rotary engine 12 is used as or part of an automobile engine. In a particular embodiment, the rotary engine 12 is used as or part of an aircraft engine (prime mover engine or APU).

The engine 12 includes a system for delivering lubricant to the peripheral or apex seals 56, which in a particular embodiment allows the frequency and quantity of delivered lubricant to be adjusted, for example based on operating conditions.

Figure 3A:
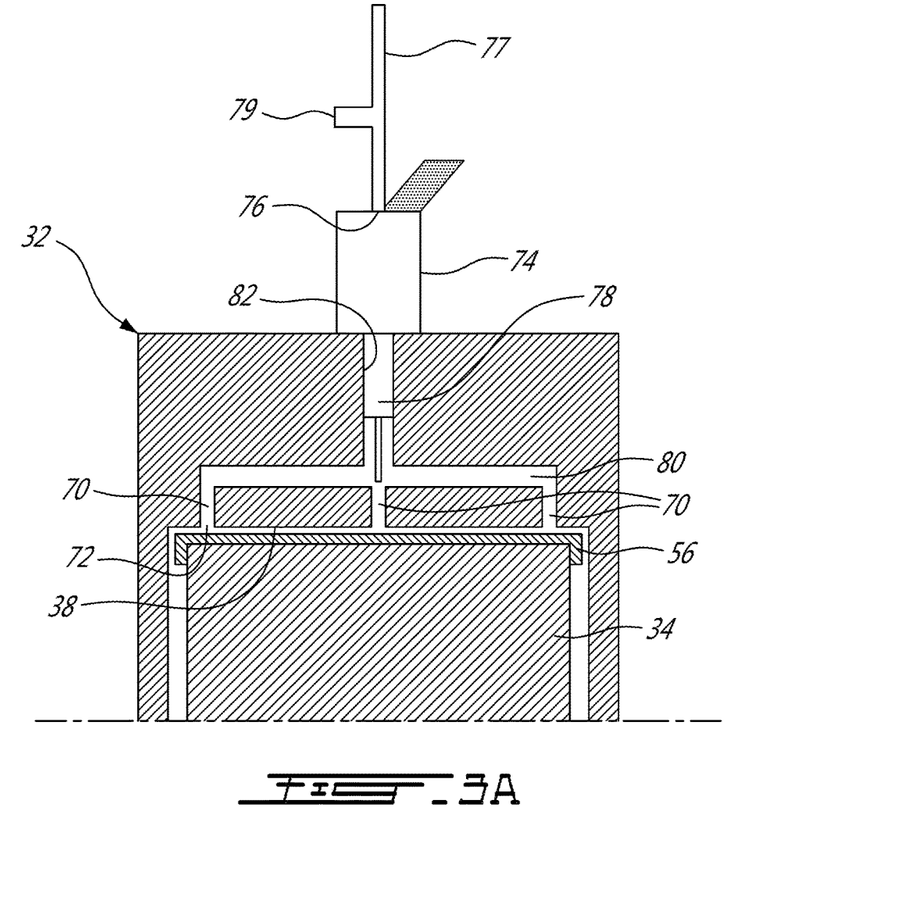
FIG. 3A is a schematic cross-sectional view of part of a housing of a rotary engine such as shown in FIG. 1 configured for lubricant injection in accordance with a particular embodiment, taken in plane perpendicular to that of FIG. 1.
Figure 3B:
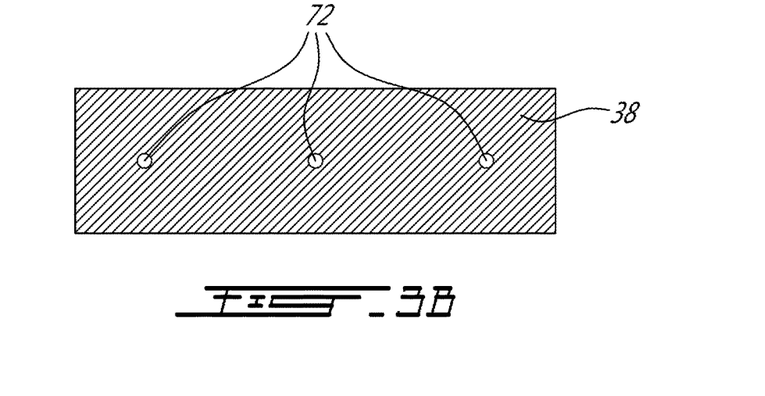
FIG. 3B is a schematic plan view of an inner surface of a peripheral wall of the housing of FIG. 3A.

Referring to FIGS. 3A-3B, the housing 32 has at least one fluid passage 70 defined therethrough; in the embodiment shown, three axially spaced apart fluid passages 70 are defined (e.g. regularly spaced apart), for example each having a circular cross-section. Each fluid passage 70 terminates in an opening 72 defined in the portion of the inner surface of the housing 32 engaging the seals 56 during rotation of the rotor 34. As can be seen more clearly in FIG. 3B, the inner surface of the peripheral wall 38 thus has a respective opening 72 defining therethrough at the end of each of the fluid passages 70. During rotation of the rotor 34, the seals 56 are biased against and slide along the inner surface of the peripheral wall 38, and accordingly across these openings 72.

An injector 74 is provided, having an inlet 76 and a selectively openable and closable outlet 78. The inlet 76 is in fluid communication with a pressurized lubricant source through a suitable feed conduit 77 including a pressure and temperature sensing port 79. The outlet 78 is in fluid communication with each fluid passage 70 for delivering the pressurized lubricant to each seal 56.

In the embodiment shown, the housing 32 includes a manifold 80 defined therein. The outlet 78 of the injector 74 is in fluid communication with the manifold 80, by being received in an injector opening 82 defined through the housing 32 and communicating with the manifold 80. In the embodiment shown, the body of the injector 74 is located outside of the housing 32; alternately, the body of the injector 74 may be received within the housing 32. Each fluid passage 70 opening into the inner surface of the peripheral wall 38 extends from the manifold 80, in fluid communication therewith.

Figure 4A:
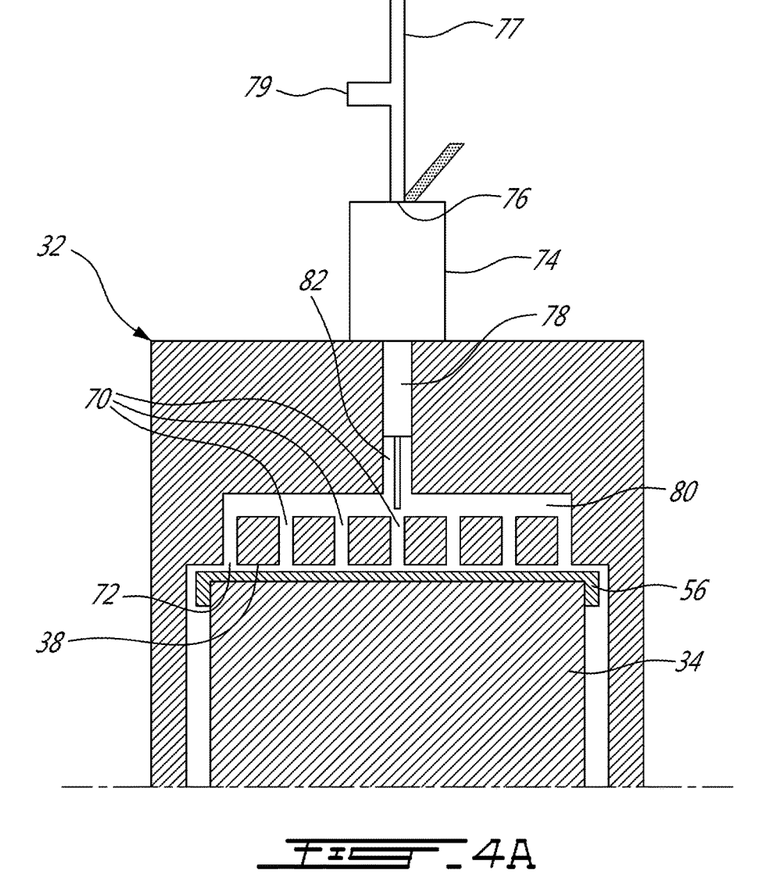
FIG. 4A is a schematic cross-sectional view of part of a housing of a rotary engine such as shown in FIG. 1 configured for lubricant injection in accordance with another particular embodiment, taken in plane perpendicular to that of FIG. 1.
Figure 4B:
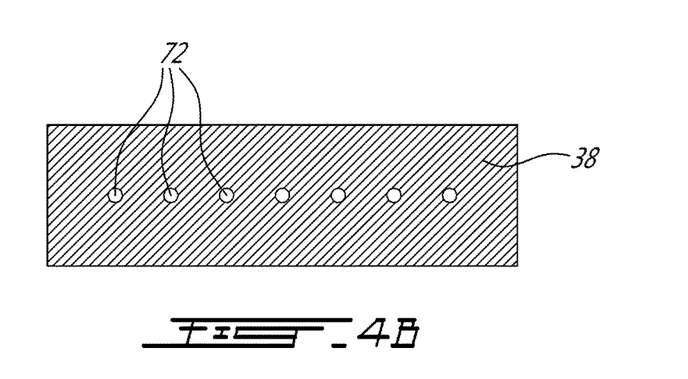
FIG. 4B is a schematic plan view of an inner surface of a peripheral wall of the housing of FIG. 4A.

In the embodiment shown in FIGS. 4A-4B, the housing 32 has seven (7) spaced apart fluid passages 70 defined therethrough, for example regularly spaced apart along the axial direction of the housing 32. As in the embodiment of FIGS. 3A-3B, the outlet 78 of the injector is received in an injector opening 82 defined through the housing 32 and communicating with a manifold 80, and each fluid passage 70 opening into the inner surface of the peripheral wall 38 extends from the manifold 80, in fluid communication therewith.

Figure 5A:
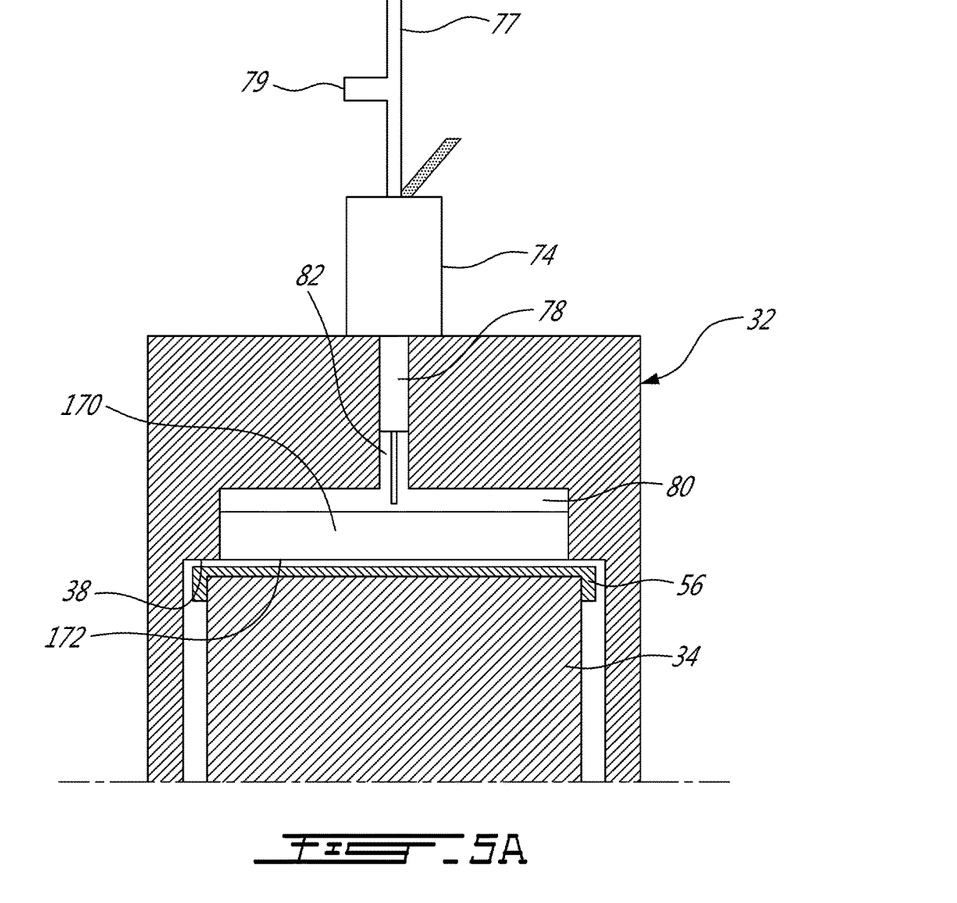
FIG. 5A is a schematic cross-sectional view of part of a housing of a rotary engine such as shown in FIG. 1 configured for lubricant injection in accordance with another particular embodiment, taken in plane perpendicular to that of FIG. 1.
Figure 5B:
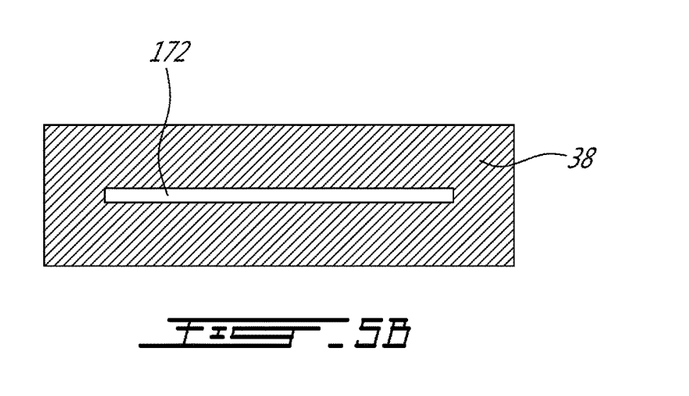
FIG. 5B is a schematic plan view of an inner surface of a peripheral wall of the housing of FIG. 5A.

In the embodiment shown in FIGS. 5A-5B, the housing 32 has a single fluid passage 170 defined therethrough, shaped as an elongated slot extending along the axial direction of the engine, and defining an elongated opening 172 in the inner surface of the peripheral wall 38. Again, the outlet 78 of the injector 74 is received in an injector opening 82 defined through the housing 32 and communicating with a manifold 80, and the fluid passage 170 opening into the inner surface of the peripheral wall extends from the manifold 80, in fluid communication therewith.

It is understood that different numbers and/or configurations of fluid passages 70, 170 may alternately be used.

Figure 6:
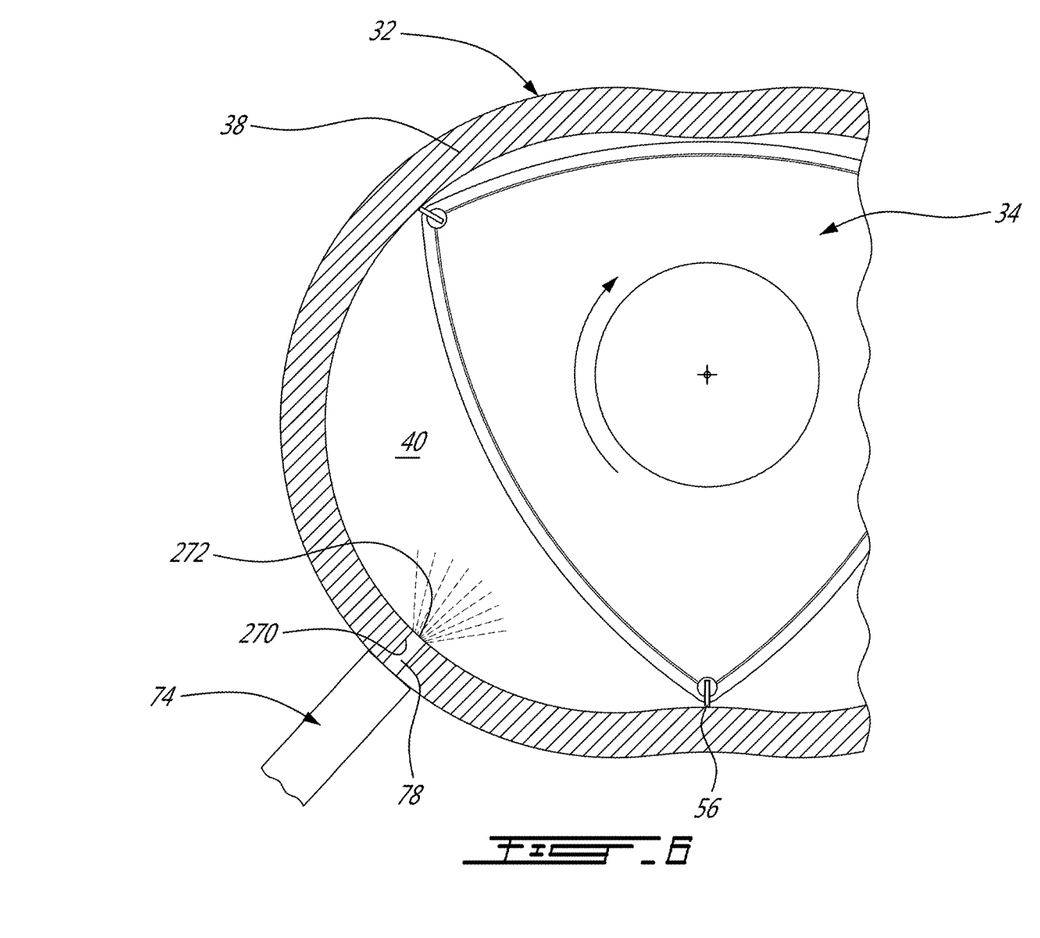
FIG. 6 is a schematic cross-sectional view of part of a rotary engine such as shown in FIG. 1 configured for lubricant injection in accordance with another particular embodiment, taken in plane perpendicular to the axial direction of the engine.

Moreover, it is understood that the lubricant may alternately be injected using a direct injection system. For example, as shown in FIG. 6, the outlet 78 of the injector 74 is received in the fluid passage 270 defined through the peripheral wall 38, and located in proximity of the inner surface of the peripheral wall 38 for direct lubricant delivery to each seal 56 as it slides over the opening 272 defined in the inner surface by the fluid passage 270.

In a particular embodiment where the intake port 48 is defined through the peripheral wall 38, the opening 72, 172, 272 of each fluid passage 70, 170, 270 is positioned after the intake port 48 and before the combustion starts, following the direction of movement of the apex seals 56 upon rotation of the rotor 34, i.e. the seals 56, in order, pass over the intake port 48, pass over the opening(s) 72, 172, 272, and then reach the zone of combustion. For example, in a particular embodiment the opening(s) 72, 172, 272 is/are positioned at any location from point "A" to point "B" as indicated in FIG. 1. A similar location may also be used for an engine where the intake port is defined through the end wall 54. The feed pressure to the injector 74 is adjusted based on the chamber pressure at the location of the opening 72, 172, 272; accordingly, a higher feed pressure may be required if the seal lubricant injection is made later in the compression stroke. In a particular embodiment shown in FIG. 1, the opening(s) 72, 172, 272 is/are defined adjacent to and after the intake port 48.

In an alternate embodiment, the seal lubricant may be injected in the top dead center section of the housing 32; however, such positioning may be more complex due to high temperature and pressure and to the presence of the high pressure fuel injection system at this location. In another alternate embodiment, the seal lubricant Injection may be performed in the expansion stroke of the engine; however, such a configuration may lead to loss of lubricant in the exhaust and/or intake port, particularly when these ports are defined through the peripheral wall. Higher temperatures of the expansion side may also cause coking of the lubricant in the fluid passage 70, 170, 270.

Figure 7:
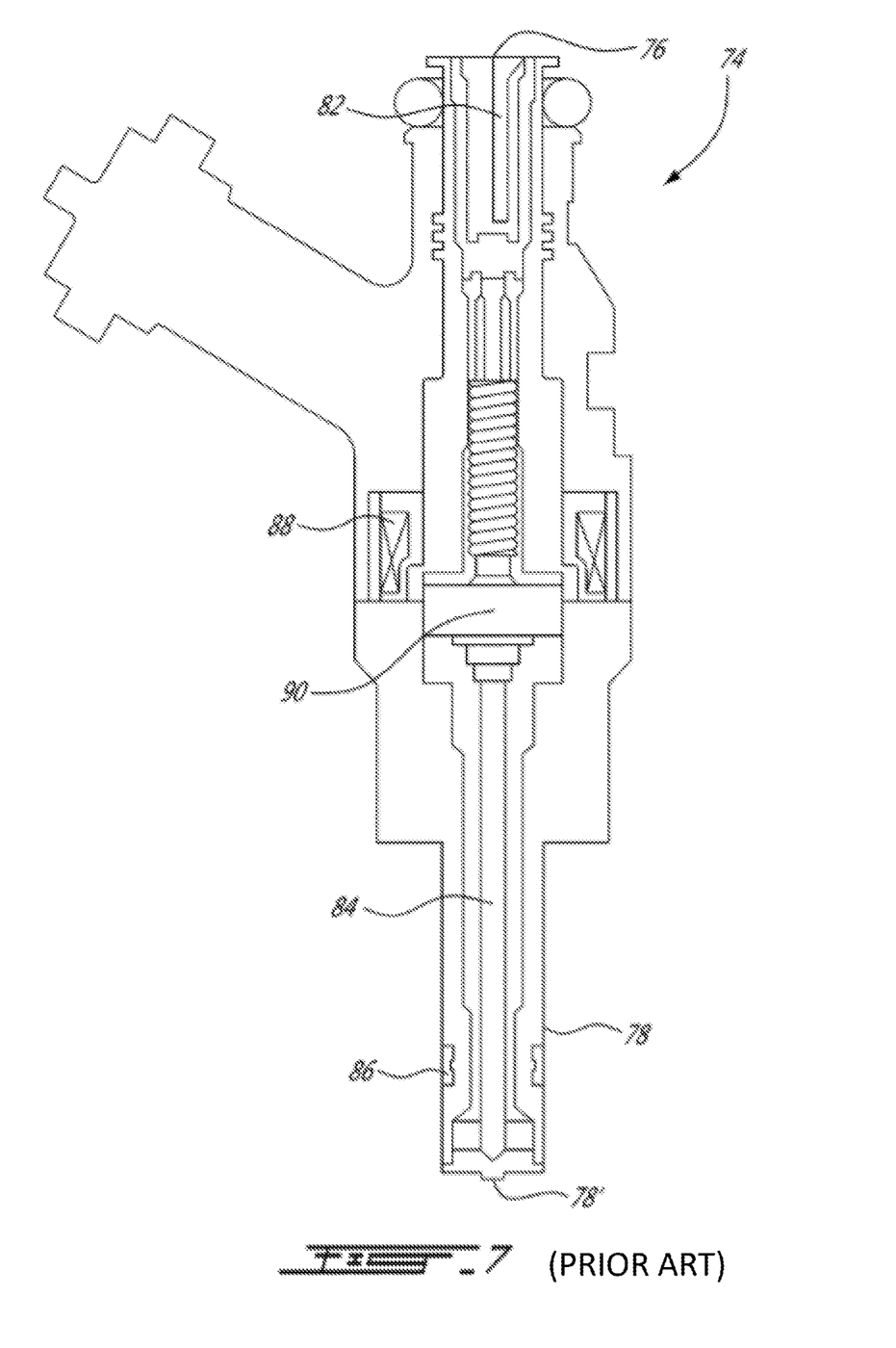
FIG. 7 is a schematic cross-sectional view of an injector according to a particular embodiment, which may be used to inject lubricant in rotary engines such as shown in FIGS. 3-6.

In a particular embodiment, the injector 74 is or is similar to an injector configured for gasoline direct injection (GDI). An example of a GDI injector is shown in FIG. 7, where the inlet 76 is in communication with the outlet 78 through a strainer 82. The outlet 78 includes an outlet opening 78' which is selectively closed by a needle 84 biased toward the closed position and movable inwardly to disengage from the perimeter of the outlet opening 78' to open it. A seal 86 extends around the outlet portion of the injectors to sealingly engage the adjacent wall surfaces of the housing 32. In the embodiment shown, the needle 84 forms part of a solenoid valve: a magnetic coil 88 of the injector housing interacts with a magneto armature 90 connected to the needle to move the needle 84 along its axis between the open and closed configurations of the injector 74. Other types of valves may be provided to selectively open and close the outlet opening 78' of the injector 74, including, but not limited to, a piezo activated valve.

The injector 74 can be precisely activated through electrical actuation of the valve, to select the desired injection frequency and volume. GDI injectors can typically be controlled, for example by an engine control unit (see FIG. 8), to adjust flow and/or frequency of injection based on suitable parameters of the engine, including, but not limited to, injected fluid temperature and pressure, engine speed, engine load (or throttle position), intake manifold pressure, injector body temperature and engine coolant temperature; similar control can be applied to the injector 74 when used for lubricant injection to the seals 56, so that the lubricant injection can be tailored to the operating parameters of the engine.

The injector 74 thus acts as a metering device allowing control of the quantity, frequency and timing of the lubricant injection to the seals 56. Injectors of the type used for gasoline direct injection (GDI) engines typically allow good control over the injection duration, which allows for precise control of the quantity of injected lubricant over the engine operation range.

Alternately, any other suitable type of injector can be used. In a particular embodiment, the injector 74 is designed to work at a pressure of 30 to 180 psia, for example at least 60 psia, and/or to inject lubricant at a frequency of up to once per engine revolution and/or at a temperature of at least 120° F. to 250° F.

Figure 8:
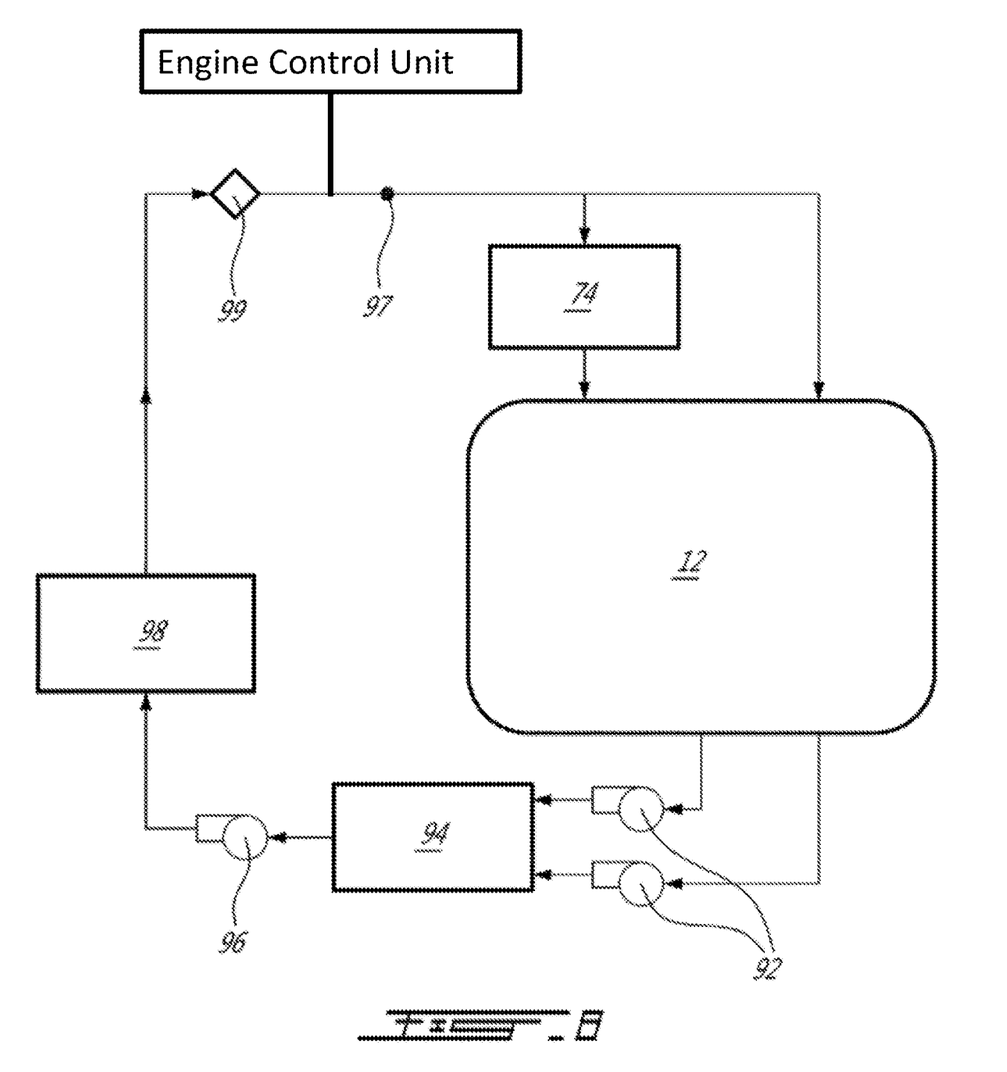
FIG. 8 is a diagram of a lubricant injection system according to a particular embodiment, which may be used with rotary engines such as shown in FIGS. 3-6 and/or with an injector such as shown in FIG. 7.

Referring to FIG. 8, an example of a lubrication injection system which may be used with any of the above described engines 12 and injectors 74 is shown. This lubrication system uses the lubricant which is circulated to the rotor 34, for example to lubricate bearings rotationally supporting the rotor 34 within the rotor cavity and/or for cooling of the rotor 34, as the lubricant injected to lubricate the seals 56. In a particular embodiment, the lubricant is oil.

The system includes a scavenge pump 92 in each line communicating with one or more of the lubrication cavities of the engine 12, for circulating the used oil back to an oil reservoir 94. A main engine oil pump 96 communicates with the oil reservoir 94 and provides pressurized oil to the engine 12. The oil circulates through a heat exchanger 98, for example located downstream of the main engine pump 96, so that the used oil can be cooled before being recirculated to the engine 12. The oil circulates through a filter 99 to remove contaminants, and is then circulated both to the injector 74 for providing oil to the seals 56 and to the various lubrication cavities of the engine 12 (e.g. bearing cavities). Sensors 97, for example located between the oil filter 99 and the injector 74/engine 12, provide relevant data (e.g. oil temperature, oil pressure) which may be used to control the pumps 92, 96 and/or the injector 74. The oil used to feed the injector 74 is thus at the main engine oil pressure (MOP), i.e. the pressurization provided by the main engine oil pump 96 is sufficient to feed the injector 74.

Figure 9:
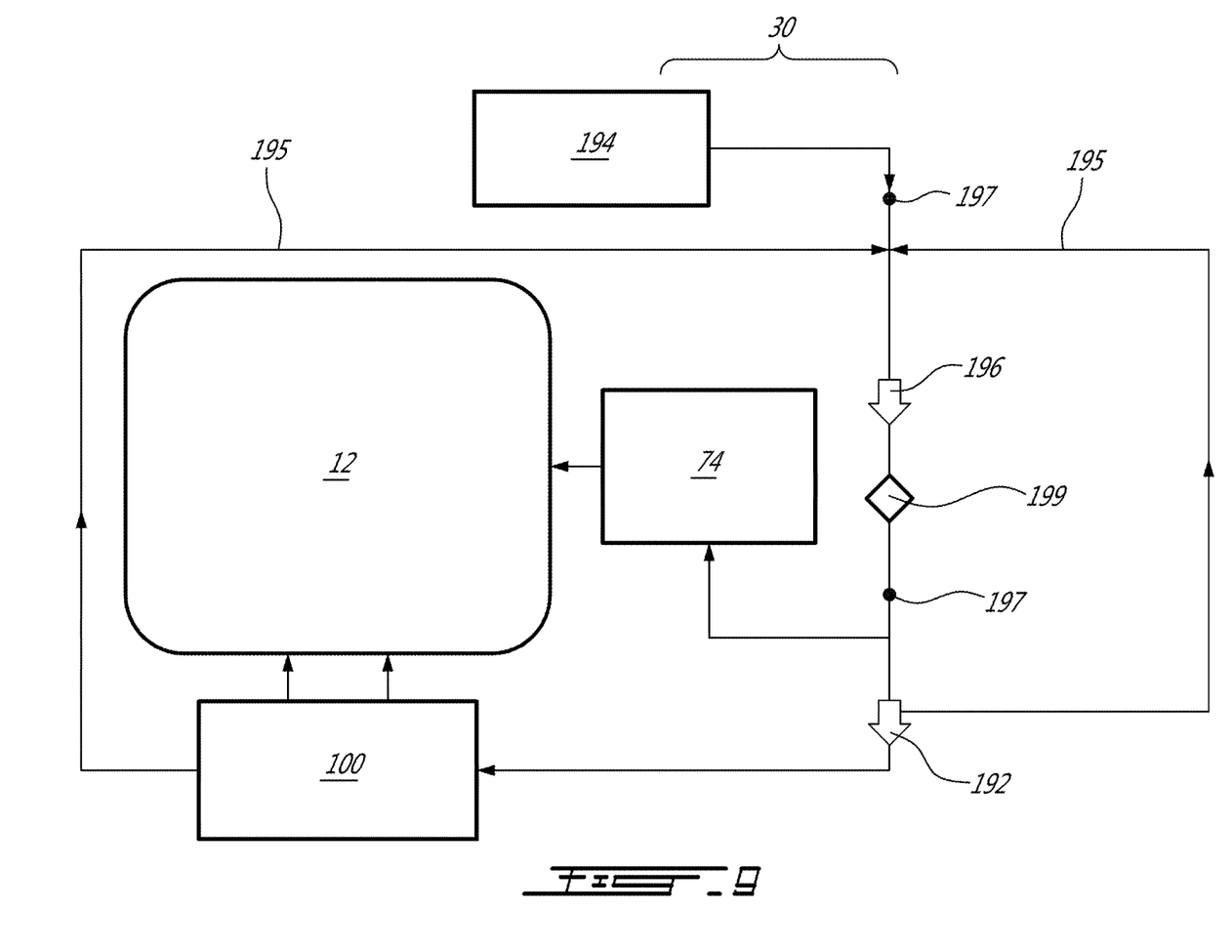
FIG. 9 is a diagram of a lubricant injection system according to a particular embodiment, which may be used in a rotary engine such as shown in FIGS. 3-6 and/or with an injector such as shown in FIG. 7.

Referring to FIG. 9, another example of a lubrication injection system which may be used with any of the above described engines 12 and injectors 74 is shown. This lubrication system uses part of the fuel circulated for combustion for injection to lubricate the seals 56.

The system includes a first stage fuel pump 196 communicating with a fuel reservoir 194 and providing pressurized fuel to the engine 12. A second stage pump 192 is provided downstream of the first stage pump 196, with a fuel filter 199 located therebetween to remove contaminants. The injector 74 for the seals 56 extracts fuel between the first stage and second stage pumps 196, 192 to use as a lubricant. The second stage pump 192 delivers fuel to a fuel injection system 100 (e.g. high pressure common rail injection system) delivering pressurized fuel to the working chambers 40 (and/or to a subchamber communicating with the working chambers) for combustion. Bypass lines 195 recirculate overflow fuel from the fuel injection system 100 and from the second stage pump 192 to a location upstream of the first stage pump 196 for recirculation. Sensors 197, for example located between the fuel reservoir 194 and the first stage pump 196, and between the first stage pump 196 and the injector 74, provide relevant data (e.g. fuel temperature, fuel pressure) which may be used to control the he pumps 92, 96, fuel injection system 100 and/or the injector 74.

It is understood that the particular configuration of the lubrication injection system may vary. For example, the lubrication injection system for feeding the injector 74 for the seals 56 may be independent from the circulation of the other engine fluids, although such an independent system may add weight and/or complexity. In some systems which are particularly but not exclusively, suitable for automotive purposes, the scavenge pumps may be omitted.

Although a single injector 74 has been shown, it is understood that more than one injector 74 can alternately be provided. The two or more injectors 74 could be located at different angular positions within the housing, for example one to inject seal lubricant after the intake port and another to inject lubricant in the expansion section of the housing. The two or more injectors 74 could alternately be located at the same angular position. The multiple injectors 74 could be used for direct injection or for injection into a manifold, as described above.

The present disclosure accordingly allows for lubricating the peripheral or apex seals 56 by circulating lubricant from a pressurized lubricant source (such as pump 96 and oil reservoir 94, or pump 196 and fuel reservoir 194) to the injector 74, selectively opening the outlet 78 of the injector 74, and when the outlet 78 is open, delivering the pressurized lubricant through the housing 32 and to the inner surface of the rotor cavity with the injector 74. The seals 56 contact the inner surface upon rotation of the rotor 34 within the rotor cavity, and are accordingly lubricated. The pressurized lubricant may be delivered through a manifold 80 defined in the housing 32 or delivered by the injector 74 directly to the seals 56. The injector 74 allows metering of the quantity of lubricant being delivered.

In a particular embodiment, and when compared to a prior art system where lubricant delivery to apex seals is controlled by a separate mechanical pump driven by the engine shaft 16, the system described herein allows for a more complete and improved control over the frequency and quantity of delivered lubricant by making use of suitable engine sensor inputs (e.g. lubricant pressure and temperature, engine speed) to define the injection frequency and volume. This is turn may allow for a reduction of lubricant consumption while maintaining the same wear rates and performance of the engine. Moreover, the present system is in a particular embodiment more compact and lightweight, which is crucial for aerospace applications. Emissions of the engine may also be positively influenced through suitable tailoring of the injection parameters. When commercially available GDI injectors are used, the system may allow for a reduction in cost. The system also allows for other fluids providing acceptable wear rates to be used as lubricant, for example fuel (heavy fuel, diesel fuel, etc.)

The above description is meant to be exemplary only, and one skilled in the art will recognize that changes may be made to the embodiments described without departing from the scope of the invention disclosed. For example, the seal lubricant injection may be applicable to lubricate peripheral seals other than apex seals, in other rotary engines having different types of configuration (e.g. peripheral seals on vanes of a rotary vane pump). Modifications which fall within the scope of the present invention will be apparent to those skilled in the art, in light of a review of this disclosure, and such modifications are intended to fall within the appended claims.

The invention claimed is:

1. An internal combustion engine comprising:
a housing defining a rotor cavity;
a rotor rotationally received within the rotor cavity to define a plurality of working chambers of variable volume around the rotor, the rotor having circumferentially spaced peripheral seals biased radially outwardly from the rotor and slidingly engaging a portion of an inner surface of the housing upon rotation of the rotor to separate the working chambers from one another, the housing having a fluid passage defined therethrough opening into the portion of the inner surface engaging each of the peripheral seals; and
an injector having an inlet for fluid communication with a pressurized lubricant source and a selectively openable and closable outlet, the outlet being in fluid communication with the fluid passage for delivering the pressurized lubricant to the peripheral seals through the fluid passage; and
an engine control unit, and sensors disposed upstream of the injector, the sensors configured to communicate data related to the pressurized lubricant to the engine control unit, the engine control unit configured for selectively controlling the openable and closeable outlet of the injector in response to the data received from the sensors.

2. The engine as defined in claim 1, further comprising the pressurized lubricant source including a pump and an oil reservoir, the oil reservoir being in fluid communication with the rotor to provide one or both of lubrication for bearings rotationally supporting the rotor within the rotor cavity and cooling to the rotor, the oil reservoir communicating with the rotor through the pump and through a heat exchanger for cooling the oil, the injector being fed by the pump.

3. The engine as defined in claim 1, further comprising the pressurized lubricant source including a pump and a fuel reservoir, the fuel reservoir being in fluid communication with a fuel injection system for combustion in the working chambers, the fuel reservoir being in fluid communication with the fuel injection system through the pump.

4. The engine as defined in claim 1, wherein the outlet of the injector is in fluid communication with a manifold defined in the housing, the fluid passage being in fluid communication with the manifold.

5. The engine as defined in claim 4, wherein the housing further comprises at least one additional fluid passage defined therethrough opening into the one of the inner surfaces for delivering the lubricant to the peripheral seals, the manifold also in fluid communication with the at least one additional fluid passage.

6. The engine as defined in claim 4, wherein the fluid passage is an elongated slot extending along an axial direction of the housing.

7. The engine as defined in claim 1, wherein the outlet of the injector is received in the fluid passage and located in proximity of the portion of the inner surface engaging each of the peripheral seals for direct lubricant delivery to the peripheral seals.

8. The engine as defined in claim 1, wherein the peripheral seals are apex seals, the rotor having circumferentially spaced apex portions each including one of the apex seals biased radially outwardly from an outer surface of the rotor.

9. The engine as defined in claim 1, wherein the engine control unit is configured for selectively controlling the openable and closeable outlet to select a quantity of the pressurized lubricant delivered to the peripheral seals.

10. The engine as defined in claim 1, wherein the engine control unit is configured for selectively controlling the openable and closeable outlet to select a frequency of injection of the pressurized lubricant delivered to the peripheral seals.

11. The engine as defined in claim 1, wherein the engine control unit is configured for selectively controlling the openable and closeable outlet to select a duration of injection of the pressurized lubricant delivered to the peripheral seals.

12. The engine as defined in claim 1, wherein the data communicated by the sensors includes a temperature of the pressurized lubricant and/or a pressure of the pressurized lubricant.

13. A housing for a Wankel engine, comprising:
a peripheral wall extending between two axially spaced apart end walls, the peripheral and end walls cooperating to enclose a rotor cavity configured for sealingly engaging a rotor rotatable therein, the housing having a fluid passage defined therethrough opening into an inner surface of the peripheral wall to communicate with the rotor cavity;
an injector having an inlet for fluid communication with a pressurized lubricant source and a selectively openable and closable outlet, the outlet being in fluid communication with the fluid passage for delivering the pressurized lubricant to the rotor cavity, the injector being operable to selectively control the openable and closeable outlet; and
an engine control unit, and sensors disposed upstream of the injector, the sensors configured to communicate data related to the pressurized lubricant to the engine control unit, the engine control unit configured for selectively controlling the openable and closeable outlet of the injector in response to the data received from the sensors.

14. The housing as defined in claim 13, further comprising the pressurized lubricant source including a pump and an oil reservoir, the oil reservoir being in fluid communication with the rotor to provide one or both of lubrication for bearings rotationally supporting the rotor within the rotor cavity and cooling to the rotor, the oil reservoir communicating with the rotor through the pump and through a heat exchanger for cooling the oil.

15. The housing as defined in claim 13, further comprising the pressurized lubricant source including a pump and a fuel reservoir, the fuel reservoir being in fluid communication with a fuel injection system for combustion, the fuel reservoir being in fluid communication with the fuel injection system through the pump.

16. The housing as defined in claim 13, wherein the outlet of the injector is in fluid communication with a manifold defined in the housing, the fluid passage being in fluid communication with the manifold.

17. The housing as defined in claim 16, wherein the housing further comprises at least one additional fluid passage defined therethrough opening into the inner surface of the peripheral wall, the manifold also in fluid communication with the at least one additional fluid passage.

18. The housing as defined in claim 16, wherein the fluid passage is an elongated slot extending along an axial direction of the housing and extending through the inner surface of the peripheral wall.

19. The housing as defined in claim 13, wherein the outlet of the injector is received in the fluid passage and located in proximity of the inner surface of the peripheral wall.

20. The housing as defined in claim 13, wherein the housing has an intake port defined therethrough opening into the inner surface of the peripheral wall to communicate with the rotor cavity, the fluid passage positioned after the intake port and before a combustion zone of the housing in a direction of rotation of the rotor.

\* \* \* \* \*